United States Patent
Passler et al.

(10) Patent No.: US 11,627,548 B1
(45) Date of Patent: Apr. 11, 2023

(54) DETERMINING A PASSIVE GEOLOCATION OF A WIRELESS DEVICE BY MERGING CIRCULAR ERROR PROBABILITY ELLIPSES

(71) Applicant: SR Technologies, Inc., Sunrise, FL (US)

(72) Inventors: Mark Passler, Boca Raton, FL (US); Nicholas D. Boyer, Coral Springs, FL (US); Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 17/901,211

(22) Filed: Sep. 1, 2022

Related U.S. Application Data

(60) Provisional application No. 63/247,582, filed on Sep. 23, 2021.

(51) Int. Cl.
*H04W 64/00* (2009.01)
*H04W 4/02* (2018.01)
*H04W 4/029* (2018.01)

(52) U.S. Cl.
CPC ........... *H04W 64/00* (2013.01); *H04W 4/023* (2013.01); *H04W 4/029* (2018.02)

(58) Field of Classification Search
CPC ...... H04W 4/023; H04W 4/029; H04W 64/00
See application file for complete search history.

(56) References Cited

U.S. PATENT DOCUMENTS

| | | | |
|---|---|---|---|
| 9,921,294 B2 | 3/2018 | Passler | |
| 10,299,077 B1* | 5/2019 | Liu | H04W 24/08 |
| 2011/0034122 A1* | 2/2011 | Kennedy, Jr. | H04W 64/00 455/7 |
| 2015/0111600 A1* | 4/2015 | Liu | H04W 64/00 455/456.1 |
| 2016/0260022 A1* | 9/2016 | Yamada | G06N 5/02 |
| 2017/0220968 A1* | 8/2017 | Lugo | H04W 4/08 |

* cited by examiner

*Primary Examiner* — Dai Phuong
(74) *Attorney, Agent, or Firm* — Christopher & Weisberg, P.A.

(57) ABSTRACT

A method in a measuring station is described. The method includes determining a plurality of Time of Flights (TOFs) corresponding to plurality of beacons and determining an overall circular error probability ellipse (CEP) based at least in part upon a plurality of times of departure and a corresponding plurality of measuring station positions for each TOF. The method further includes determining at least one individual CEP of a plurality of individual CEPs if at least one of a predetermined time has elapsed and the measuring station has travelled a predetermined distance and determining a merged CEP, where the merged CEP includes the plurality of individual CEPs. Further, the merged CEP is determined to be a better CEP if the merged CEP is more consistent with the plurality of individual CEPs than with the overall CEP. The better CEP is usable to determine a location of a wireless device.

19 Claims, 13 Drawing Sheets

START

Determine a plurality of Time of Flights, TOFs, corresponding to the plurality of beacons, the plurality of TOFs being determined based at least in part upon a plurality of Time of Departures, TODs, corresponding to the plurality of beacons and a plurality of Time of Arrivals, TOAs, corresponding to the plurality of beacons
1301

Determine an overall circular error probability ellipse, CEP, based at least in part upon the plurality of TODs and a corresponding plurality of measuring station positions for each TOF
1302

Determine a merged CEP, the merged CEP including the plurality of individual CEPs
1303

Determine the merged CEP is a better CEP if the merged CEP is more consistent with the plurality of individual CEPs than with the overall CEP, the better CEP being usable to determine the location of the wireless device
1304

END

DETERMINING A PASSIVE GEOLOCATION OF A WIRELESS DEVICE BY MERGING CIRCULAR ERROR PROBABILITY ELLIPSES

CROSS-REFERENCE TO RELATED APPLICATION

This application is related to and claims priority to U.S. Provisional Patent Application Ser. No. 63/247,582, filed Sep. 23, 2021, entitled IMPROVEMENTS FOR PASSIVE GEO LOCATION OF A WLAN DEVICE BY THE MERGING OF CEPS, the entirety of which is incorporated herein by reference.

TECHNICAL FIELD

The present disclosure relates to geolocating wireless devices, in particular, to a method and measuring station for determining a geolocation of a wireless device by merging circular error probability ellipses.

BACKGROUND

The location of wireless local area network (WLAN) devices can be determined by various means. This disclosure relates to locating devices (e.g., determining the location of devices) that are based upon the IEEE 802.11 technology, commonly known as Wi-Fi. Various methods can be used to locate an access point (AP) or a station (STA). These methods may be classified as active, passive and combined active and passive. In a passive location scheme, a measuring device monitors the time of arrival TOA, of non-stimulated transmissions from a target device. In such passive location systems, it is common to use multiple measuring devices to determine the location. In such a scheme, simultaneous TOA measurements are taken by different measuring devices situated at different points, and from these measurements the location of the target device is calculated. For example, in a passive location scheme, the TOA of a transmission from the target may be simultaneously received at several sites. The difference in the TOAs between two sites is known as the time difference of arrival (TDOA). The TDOA is related to the difference in path lengths between the target and each receiving site, and for each pair of receivers, the TDOA results in a hyperbola along which the location of the target lies. The addition of a third site may provide a second hyperbola and the location of the target may be indicated by the interception of the two hyperbolas.

First consider the following review of the TDOA method so that differences with the proposed method and arrangements of the present disclosure can be readily understood. FIG. 1 is a diagram of a typical passive location system 100 which includes three measuring stations 110a, 110b and 110c (referred to collectively herein as "measuring stations" or "measuring receivers"). The target is a wireless device 120, such as, for example, an Access Point (AP) that is to be located by the three measuring stations. The distance of the wireless device 120 from receiving measuring station 110a is D1, 130. The distance of the wireless device 120 from receiving measuring station 110b is D2, 140. The distance of the wireless device 120 from receiving measuring station 110c is D3, 150. A transmission from the wireless device 120 is received at each of the three measuring stations 110a, 110b, and 110c, at times t1, t2, and t3 which are directly related to the distances D1, 130, D2, 140 and D3, 150. If the transmission from the wireless device 120 is at time T1, then it will be received at a measuring station at time (T1+D/c) where D is the distance of the measuring station from the wireless device 120, and c is the speed of light. Hence, t1=T1+D1/c, t2=T1+D2/c and t3=T1+D3/c. The TDOA for the measuring stations 110a and 110b is therefore TDOA12=t1−t2=(D1−D2)/c, and the TDOA for the measuring stations 110b and 110c is TDOA23=t2−t3=(D2−D3)/c.

FIG. 2 is a block schematic diagram of an exemplary IEEE 802.11 infrastructure network 200. A number of stations, 220a, 220b, 220c, 220d, 220e, and 220f are associated to a wireless device 120 such as an access point (AP), which, in turn, is connected to a hard wired distribution system, DS, 210. Thus, "wireless device" as used throughout this disclosure need not be a totally wireless device and may be connected to a wired network. In such a network, wireless device 120 may transmit beacons (e.g. signals) periodically in order to allow mobile stations 220 to locate and identify the network and to convey information to the stations, in particular, the timestamp, beacon interval and capability information.

FIG. 3 is a diagram that depicts the transmissions of the beacons with respect to the time axis 300. The wireless device 120 in FIG. 2, will attempt to transmit beacons, for example beacons 330, 340, 350, 360 and 370 at a regular time interval, tb, 310, known as Target Beacon Transmission time, TBTT. In practice, the time tb' 320 between the two beacons may be greater or less than TBTT. The wireless device 120 advertises this ideal interval, TBTT, in the beacon frame, but the beacon transmission may be delayed beyond TBTT because of other traffic. In addition, because a beacon is never retransmitted, if the reception of the beacon at a station is corrupted for any reason, it is possible that that station may not receive every beacon. A field transmitted within every beacon is the Timestamp which is 64 bits long and contains the value of the wireless device's synchronization timer at the time that the frame was transmitted. This is known as the timer synchronization function, or TSF. In infrastructure network 200, associated stations 220 may update their own TSF timers with the value of the timer it receives from the wireless device 120 in the beacon frame, modified by any processing time required to perform the update operation. Hence, associated stations 220 maintain synchronous timing with the wireless device 120. When the beacon TOA is being measured by an un-associated measuring station, then the measuring station may not update its timer to synchronize with the wireless device TSF but may measure the TOA using its own timer. A common tolerance for the timer within a wireless device 120 is 3-5 ppm and hence the relative drift between the timers of the wireless device and the measuring stations needs to be assessed.

The TDOA approach as described above requires multiple measuring receivers with disparate measurement of the same signal whose timing needs to be processed at a central analysis point. In this approach, it is required that the exact position of each of the receivers is known. An alternative approach is to use a single mobile receiving station 110.

When the beacon TOA is being measured by the un-associated measuring station 110, the measuring station 110 may not update its timer to synchronize with the wireless device TSF but may measure the TOA using its own timer. A common tolerance for the timer within a wireless device 120 is 3-5 ppm and hence the relative drift between the timers of the wireless device and the measuring stations needs to be assessed and compensated for.

Methods and arrangements relating to the assessment and compensation of the relative drift between the TSF timer in the beacons from the wireless device 120 received by the measuring station 110, the reported TOD, and the TOA measurement by the measuring station 110 and synchronization between the timers of the wireless device 120 and the measuring station 110, are known. In one such method, the synchronization may include applying a factor α for correcting the timer associated with the measuring station 110 when the measuring station 110 receives the first beacon from the wireless device 120, applying a factor β for correcting a ratio of timer rates between the two timers, and applying a factor γ for correcting changes in a timer rate ratio between the two timers.

Over time, more and more TOF measurements, TOF=TOA−TOD, may be taken by the measuring station 110. It may be assumed that the more measurements, the better the accuracy of the location calculations, but this assumes that the values for α, β and γ are somewhat constant. In the general sense, as time progresses, there is an increasing chance that the relative timer drift between the wireless device 120 and the measuring station 110 can undergo a change such that the values for β and γ change significantly. This change in drift pattern may cause significant changes in the calculated location of the wireless device 120 rendering the location estimate progressively more inaccurate.

SUMMARY

Some embodiments provide methods, apparatuses, and/or systems for determining a passive geolocation of a wireless device, e.g., by merging circular error probability ellipses.

According to one aspect of the present disclosure, a method in a measuring station is described. The method includes determining a plurality of Time of Flights (TOFs) corresponding to plurality of beacons and determining an overall circular error probability ellipse (CEP) based at least in part upon a plurality of times of departure and a corresponding plurality of measuring station positions for each TOF. The method further includes determining at least one individual CEP of a plurality of individual CEPs if at least one of a predetermined time has elapsed and the measuring station has travelled a predetermined distance and determining a merged CEP, where the merged CEP includes the plurality of individual CEPs. Further, the merged CEP is determined to be a better CEP if the merged CEP is more consistent with the plurality of individual CEPs than with the overall CEP. The better CEP is usable to determine a location of a wireless device.

According to another aspect, a measuring station is described. The measuring station is configured to receive a plurality of beacons from a wireless device and determine a location of the wireless device. The measuring station comprises processing circuitry configured to determine a plurality of Time of Flights (TOFs) corresponding to the plurality of beacons, where the plurality of TOFs is determined based at least in part upon a plurality of Time of Departures (TODs) corresponding to the plurality of beacons and a plurality of Time of Arrivals (TOAs) corresponding the plurality of beacons. The processing circuitry is further configured to determine an overall circular error probability ellipse (CEP) based at least in part upon the plurality of TODs and a corresponding plurality of measuring station positions for each TOF. At least one individual CEP of a plurality of individual CEPs is determined if at least one of a predetermined time has elapsed and the measuring station has travelled a predetermined distance. Each individual CEP of the plurality of individual CEPs corresponds to at least one of the predetermined time and the predetermined distance. A merged CEP is determined, where the merged CEP includes the plurality of individual CEPs. In addition, the processing circuitry is configured to determine the merged CEP is a better CEP if the merged CEP is more consistent with the plurality of individual CEPs than with the overall CEP. The better CEP is usable to determine the location of the wireless device.

According to one aspect, a method for merging a plurality of circular error probability ellipses (CEPs) into one CEP is described. The plurality of CEPs is associated at least in part with signaling of a wireless device. The method comprises determining an overall circular error probability ellipse (CEP) based at least in part upon a plurality of measurements taken over a period of time T; determining a plurality, n, of individual CEPs, where each individual CEP corresponds to another plurality of measurements taken over periods of time $t_i$, where $T=\Sigma_{i=0}^{n} t_i$; determining a merged CEP, where the merged CEP includes the plurality of individual CEPs; and determining the merged CEP is a better CEP if the merged CEP is more consistent with the plurality, n, of individual CEPs than with the overall CEP. The best CEP is usable to determine the location of the wireless device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 13 is a flow diagram of an example process according to some embodiments of the present disclosure.

DETAILED DESCRIPTION

This Application incorporates U.S. Pat. No. 9,921,294 by reference in its entirety.

Figure 1:
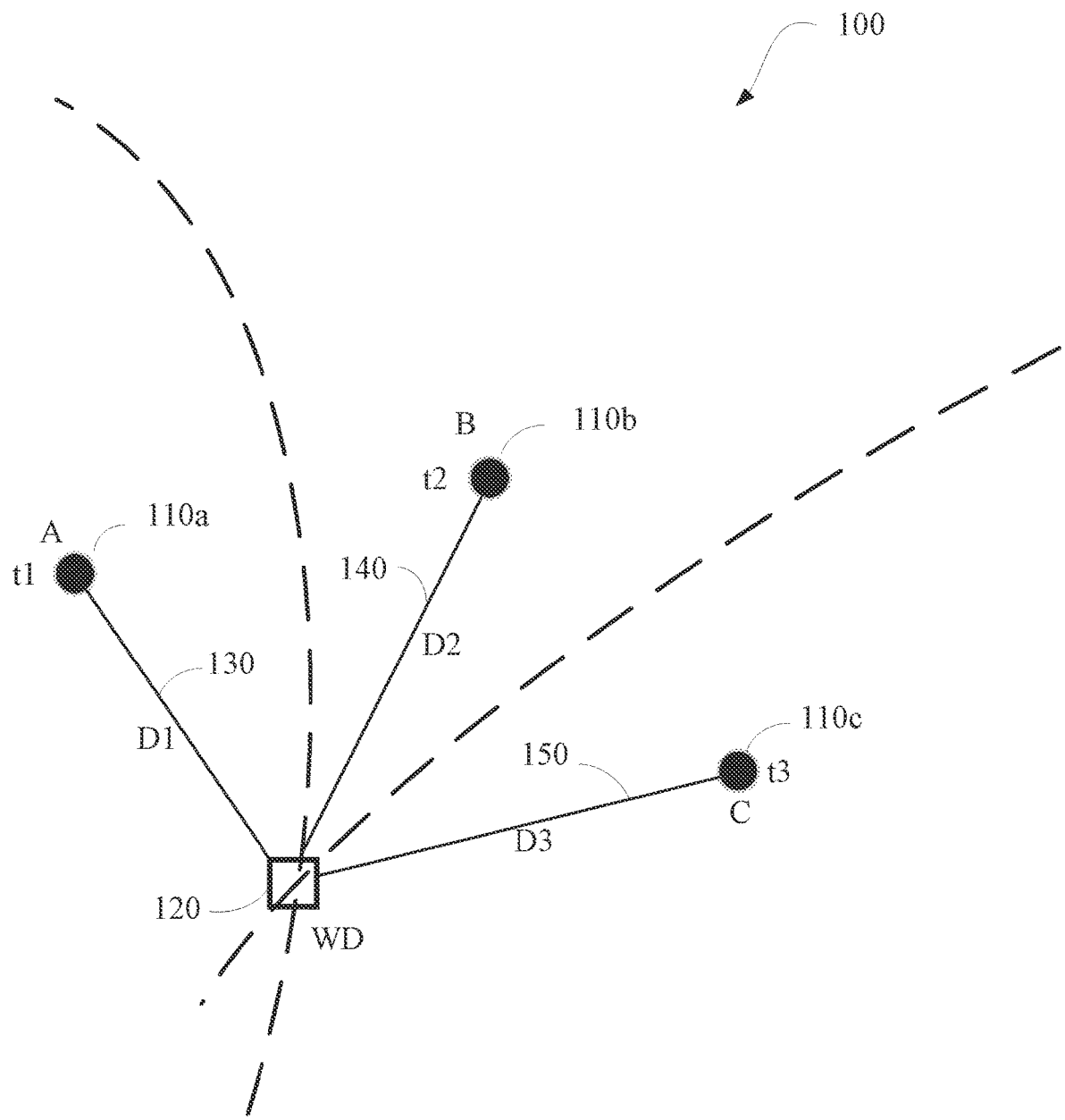
FIG. 1 is a diagram of a typical passive location system which includes three measuring stations.
Figure 2:
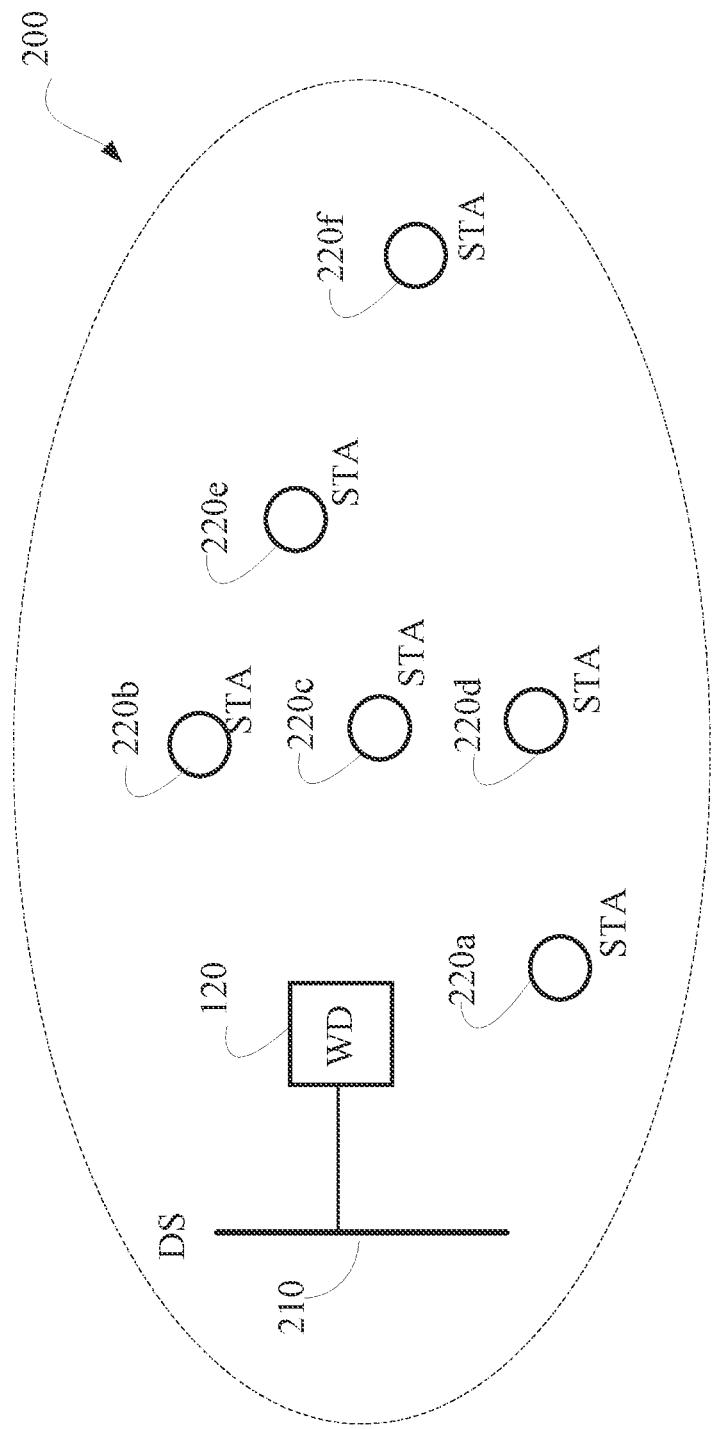
FIG. 2 is a block schematic diagram of an exemplary IEEE 802.11 infrastructure network.
Figure 3:
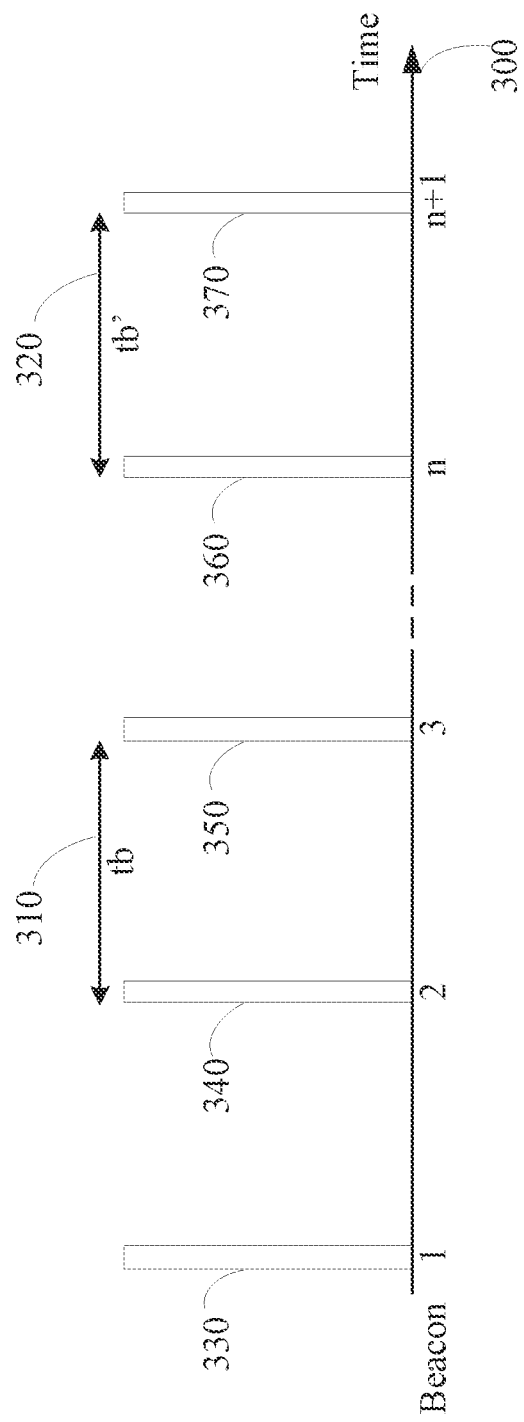
FIG. 3 is a diagram that depicts the transmissions of the beacons with respect to the time axis.
Figure 4:
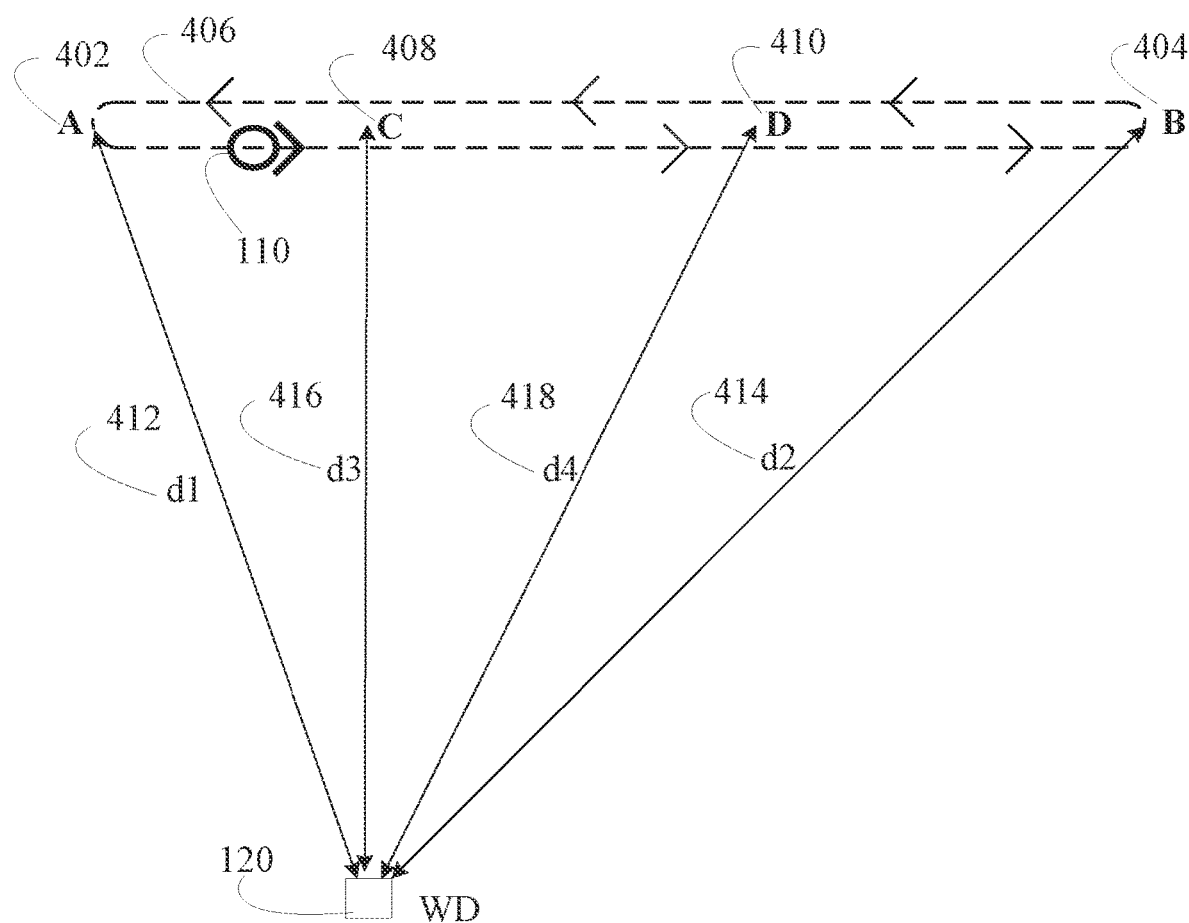
FIG. 4 is an example of a passive location system using a single measuring station and depicts a scenario where a measuring station is moving between points A and B on a path.

Referring again to the drawing figures in which like reference designators refer to like elements, FIG. 4 is an example of a passive location system using a single measuring station and depicts a scenario where a measuring station 110 is moving between points A 402 and B 404 on a path 406. FIG. 4 is a diagram of an example where a measuring station 110 is moving in a certain pattern, shown as path 406, and measuring the TOAs of the beacons from a wireless device 120. In this example, the measuring station 110 starts at position A 402, and then moves to point B 404, via points C 408 and D 410. When the measuring station 110 reaches point B 404, the measuring station 110 reverses and travels back to point A 402, again via points C 408 and D 410. As measuring station 110 moves along the path 406, measuring station 110 is constantly measuring the TOA of the beacons that are transmitted by the wireless device 120. The distances between the measuring station 110 and the wireless device 120 when the measuring station 110 is at points A 402, B 404, C 408 and D 410 are d1 412, d2 414, d3 416 and d4 418, respectively. If the time that each beacon is transmitted, the time of departure TOD, is known, then the time of flight TOF of the transmission is TOA-TOD. The TOF of the beacon transmission from wireless device 120, to the measuring station 110 may be proportional to the distance between the station 110 and the wireless device 120 at each point. Many different patterns for the measuring station 110 may be used and the pattern depicted by path 406 is just one of many possible patterns. For example, the measuring station 110 may be airborne and flying in an orbit around an area of interest that contains the target of interest, i.e., wireless device 120.

In order to use a single measuring station that takes passive measurements of multiple signals, the timings of a series of TODs from a target wireless device and TOA measurements at a measuring receiver are taken. A synchronization function for the target timer and the receiver timer may be derived and then used to determine the target location. One embodiment of this disclosure is for the case when a single measuring device is used in the passive mode and when the target is a device that is based upon the IEEE 802.11 technology, commonly known as Wi-Fi.

Figure 5:
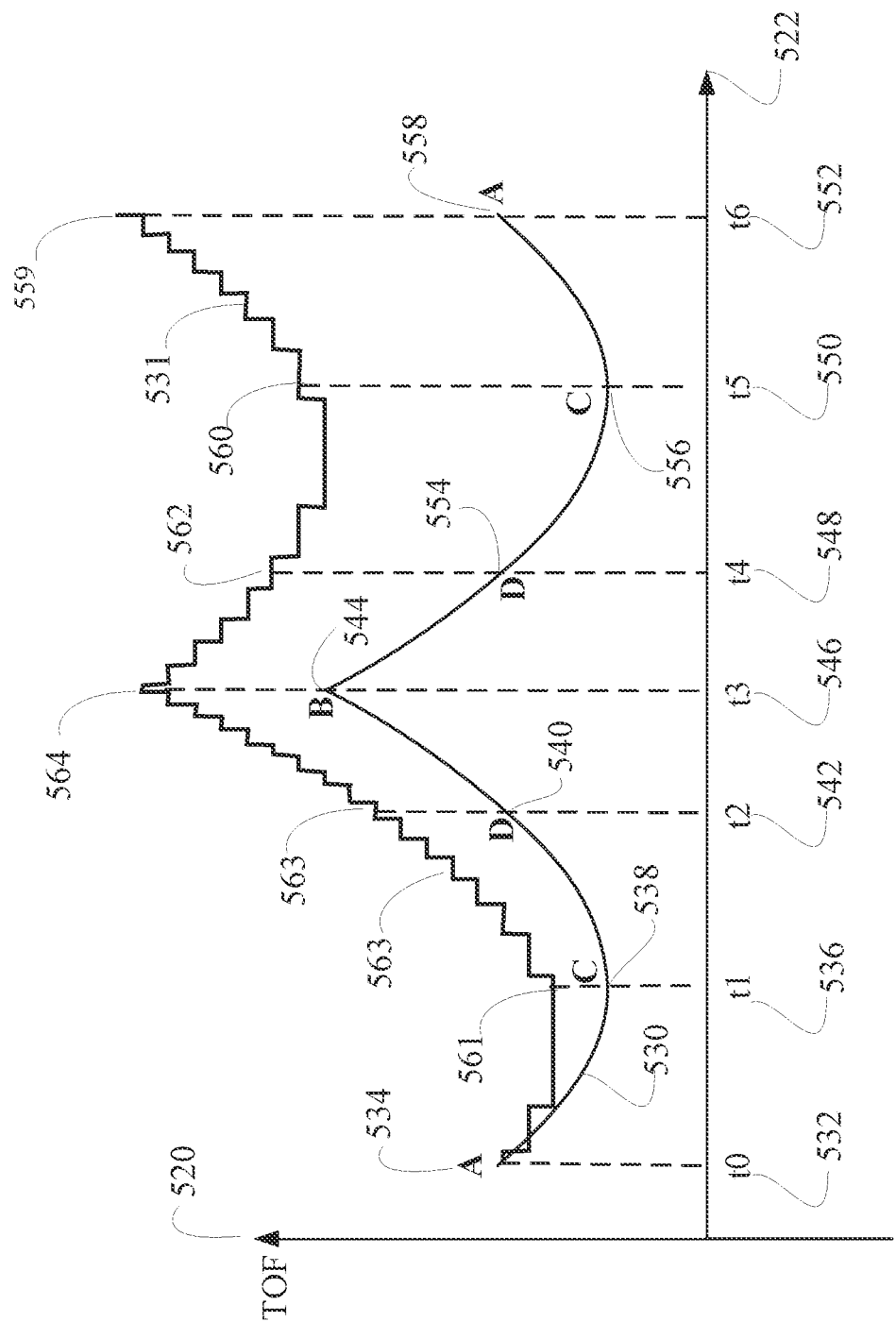
FIG. 5 is a graph depicting the TOF of the beacons transmitted by wireless device, as measured by the measuring station against time as measuring station moves from position A to position B and back as depicted in FIG. 4.

FIG. 5 is a graph depicting the TOF 520 axis of the beacons transmitted by wireless device 120, as measured by the measuring station 110 against time as shown by time 522 axis as measuring station 110 moves from position A 402 to position B 404 and back as depicted in FIG. 4. The measuring station 110 periodically or continuously measures the TOA of the beacons from wireless device 120. If the timers of the wireless device 120 and the measuring station 110 are aligned (e.g., perfectly aligned, determined to be aligned based on a predetermined condition) and the TOD of each beacon is known, then plot 530 is the variation of TOF 520 against time 522. For plot 530, it is assumed that the TOA measurements are carried out for every beacon transmission. At time t0 532, the measuring station 110 measures the TOA for point A 402 and calculates TOF 534. At time t1 536, the measuring station 110 measures the TOA for point C 408 and calculates TOF 538. Point C 408, in this example, is closer to the wireless device 120 than point A 402, and this is shown by TOF 538 which is less than TOF 534. Point D 410 is at a similar distance from the wireless device 120 as is point A 402 and hence the corresponding TOF 540, measured at time t2 542, is a similar value to TOF 534. Point B 404 is the furthest distance from the wireless device 120 and hence the TOF 544, measured at time t3 546 is greater than those measured at times t0 532, t1 536 and t2 542. After time t3 546, the measuring station 110 is moving back from point B 404 towards point A 402 and at times t4 548, t5 550 and t6 552, the TOFs 554, 556 and 558, corresponding to points D 410, C 408 and A 402 are again measured. The plot 530 in FIG. 5 of the measured TOF 520 against time 522 assumes that the clocks at the wireless device 120 and the measuring station 110 are perfectly aligned. In practice, as time progresses, this may not be the case and it is necessary for the relative clock drift and offset to be determined.

Plot 531 in FIG. 5 is a re-plot of the ideal case plot 530, but where the timer on the wireless device 120 is not aligned with the timer on the measuring station 110, and a relative drift β of 0.1 ppm exists, and a zero offset a at the start time. Both TSF and TOA times are in increments of 1 μs, and a noiseless propagation environment is assumed. As time increases, the error in the TOF calculation progressively increases due to the 0.1 ppm relative drift between the measuring receiver and the wireless device timers. At time t6, 552, when the measuring receiver has returned to point A 402, first visited at time t0 532, the calculated TOF 559 is significantly in error compared to the true TOF 558. This error is directly related to the elapsed time (t6−t0) multiplied by the relative drift of 0.1 ppm. Similarly comparing the pairs of measurements where the receiving measuring station 110 is at the same points, the calculated TOF 560 is larger than TOF 561 for point C 408, at times t5 550 and t1 536; the calculated TOF 562 is larger than TOF plot 563 for point D 410, at times t4 548 and t2 542; and when the measuring station 400 is at point B 404, the error is shown by the difference in the calculated TOF 564 and the true TOF 544. Of note, in the case that the actual relative drift was, say, 4 ppm, and if the relative drift is corrected to within 0.1 ppm, then there is still a significant error as shown in FIG. 5 plot 563. Hence, the relative drift between the two timers must be (or may be) accurately compensated for.

In the example depicted in FIGS. 4 and 5, the measuring station 110 periodically or continuously measures the TOAs of the beacons from the wireless device 120 as it moves along the path 406 and calculates the TOFs. If the TOA measurements and the TOF calculations are accurate, then the time differences between points can be calculated and the location of the wireless device 120 determined using a formula developed for TDOA location. Several such formulas are well known and the final calculation of the actual location, using the time differences, does not form part of this disclosure.

One method of measuring the TOA of the beacon at the measuring station 110 is to use the internal TSF timer of the receiver of measuring station 110. In this case the TOA time would also be in 1 μs increments. In order to improve the time measurement, the TOA may be measured directly from the clock, typically 20 or 40 MHz, in the measuring station 110. The mobile measuring station 110 may be located in a ground vehicle, a vessel at sea or on water, or in a vehicle that is airborne.

U.S. Pat. No. 9,921,294 relates to using the TSF timer in the beacon, the reported TOD, the TOA measurement by the measuring station 110, and the elimination of the relative drifts and offset, i.e., synchronization, between the timers of the wireless device 120 and the measuring station 110. In consideration that the timer on the wireless device 120 and the timer on the measuring station 400 are rarely aligned, three terms are defined therein: α, representing the offset between the two timers at some time; β, representing the ratio of timer rates between the two timers at some time; and γ, representing the timewise change in timer rate ratio between the two timers at some time. A process is described of recording the TOAs of beacons at several points together with the reported or scheduled TODs, estimating the travel times and then, using the known positions of the measuring station 110, deriving an approximate location for the wireless device 120. To estimate the travel times, the wireless device 120 timer and the measuring station 110 timer must be synchronized. A sum of square residuals (SSR) approach is used to programmatically vary the wireless device latitude, wireless device longitude and the three moments α, β, and γ such that the smallest SSR results. This technique is termed "timer synchronization ranging" (TSR).

For example, in FIG. 5, where a value of β=0.1 ppm was assumed, at time t6 552, the measuring station 110 is at location A 402, and it is known that the TOF 559 should be the same as TOF 534 at time t0 532. Hence, a value for β may be calculated, the plot 563 may be corrected to be similar to the ideal plot 530, and an accurate location may then be calculated.

In the general sense, as time progresses, the value for β may change due to timer variations in the clock of the wireless device 120 and/or the measuring station 110. The term γ is introduced to handle linear changes in the value of β, but as time goes on, the value of the β term may change non-linearly rendering the estimation of values for β and γ inaccurate. Hence, over time, the calculated location, instead of progressively becoming more accurate, may start to drift and become progressively less accurate.

Figure 6:
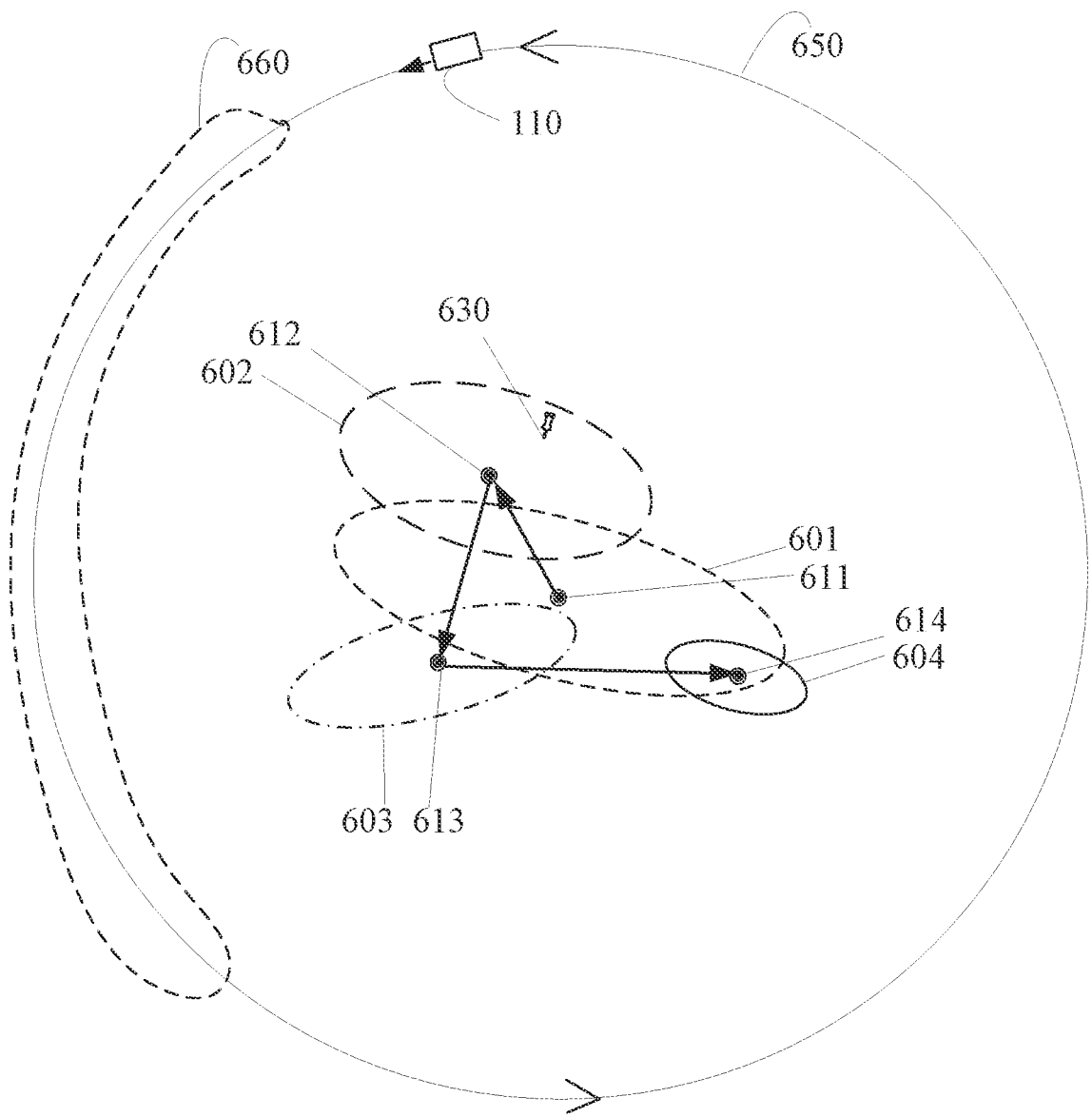
FIG. 6 is a diagram of the results of passive location of a wireless device.

FIG. 6 is a diagram of example results of a passive location mission of a wireless device 120 that was located at true location position 630. The measuring station 110 was moving in a circular orbit 650 of about 2 nm radius. After the first of four orbits, each orbit about 4 minutes each, the calculated location of the target wireless device 120 was at point 611 with a 95% circular error probability ellipse, CEP, 601. After the second orbit, the calculated location of the wireless device 120 was at point 612 with a circular error probability ellipse, CEP, 602. After the third orbit, the calculated location of the wireless device 120 was at point 613 with a circular error probability ellipse, CEP, 603. After the fourth orbit, the calculated location of the target wireless device 120 was at location point 614 with a circular error probability ellipse, CEP, 604. Hence, as the measurements progressed, the resulting calculated location and CEP for the wireless device 120 moved and after four orbits the result, location point 614 with CEP 604, was far removed from the true location position 630. It may be noted that after 8 minutes the CEP 602 did in fact enclose the true location 630, but based upon this set of results, and the moving of the calculated location, it proved impossible to determine where the true location of the wireless device 120 was. Note that in this example of a passive location measurement, the majority of the measured TOFs were when the airborne measuring station 10 was located to the west of the target as indicated by the area 660.

Figure 7:
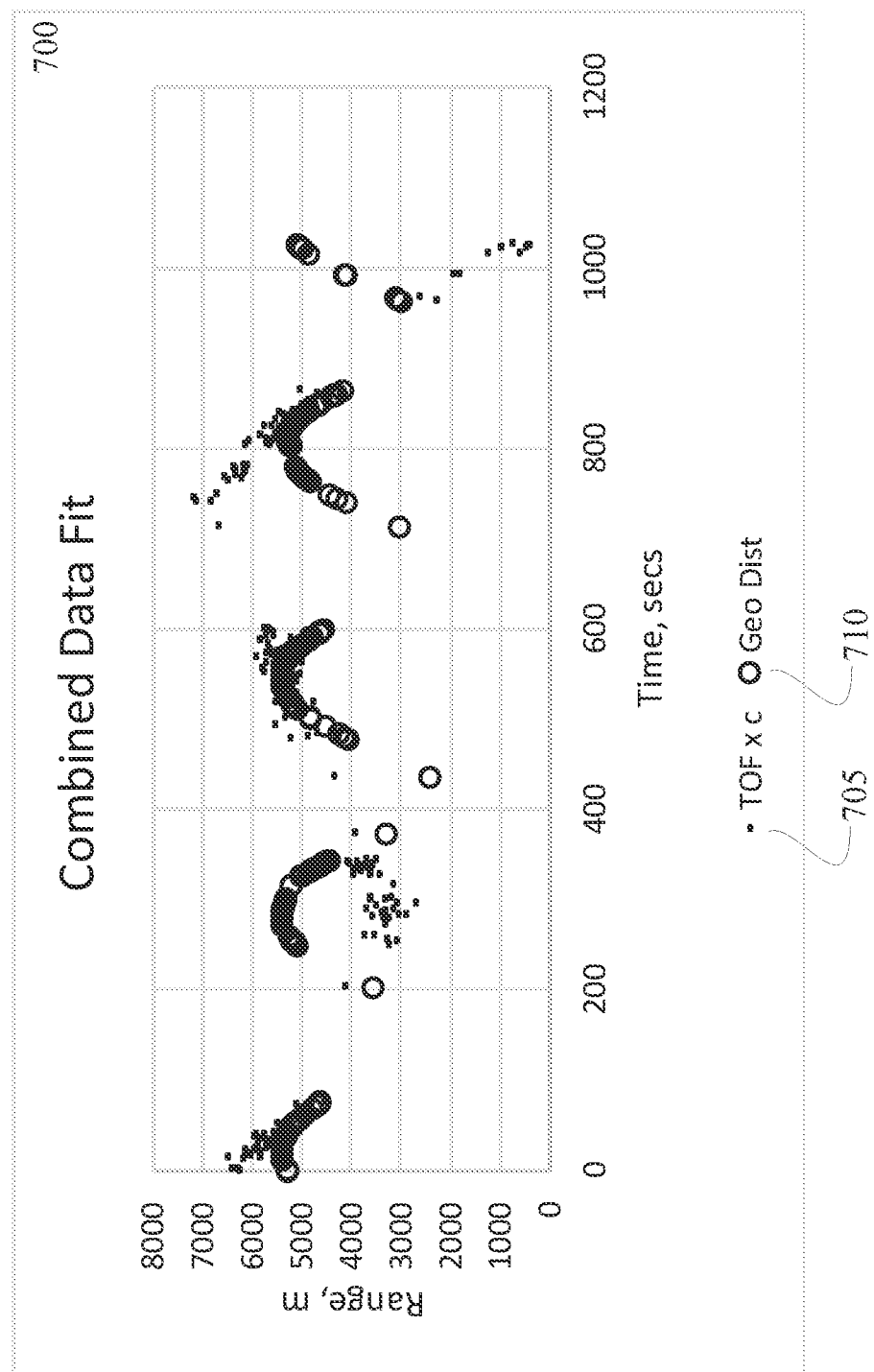
FIG. 7 is a graph of the measured ranges, and the calculated distances, to the target wireless device, that correspond to the passive location measurements depicted in FIG. 6.

FIG. 7 is a graph 700, of example measured ranges, TOF plot 705, and the calculated distance plots 710 (to the wireless device 120) that correspond to the passive location measurements depicted in the example of FIG. 6. Note that TOF=TOA−TOD, but the TOD is measured by a different timer (i.e., the trier ire the target wireless device 120) from the TOA (i.e., the timer in the measuring station 110). Hence, implicit in TOF is the model adopted for the conversion of TOD as measured by the timer in the wireless device 120 to the value as measured by the timer in the measuring station 110. As such, the TOF value represents the reliability of the model to convert from the wireless device 120 timer to the measuring station 110 timer. It may be observed that, as discussed above with reference to FIG. 6, the majority of the beacons from the wireless device 120 were received by the measuring station 110 when the measuring station 110 was in the area 660 to the west of the wireless device 120. Hence the plots 705 and 710 are in bursts or sections about 240 seconds apart, that correspond to one orbit 650. It may be observed that the plots 705 and 710 do not coincide, i.e., do not agree. The reason for the discrepancies is at least in part because the value and changes in β were not linear throughout the four orbits and the final best fit calculations (updated throughout the mission) could not cater for the non-linear changes in β. As such, the calculated geo distance could not converge. Hence, the attempt to fit the α, β, and γ parameters to the entire set of results does not provide a good fit, i.e., an inaccurate final estimated location point 614 and a CEP 604.

Non-linear changes in β may become more apparent and cause more error, the longer the mission and the longer the measurements are taken. One simple remedy may be to restrict the measurements to a fixed time, say each orbit; long enough to gather enough measurements, but not too long as to allow non-linear changes in β to cause significant errors.

Figure 8:
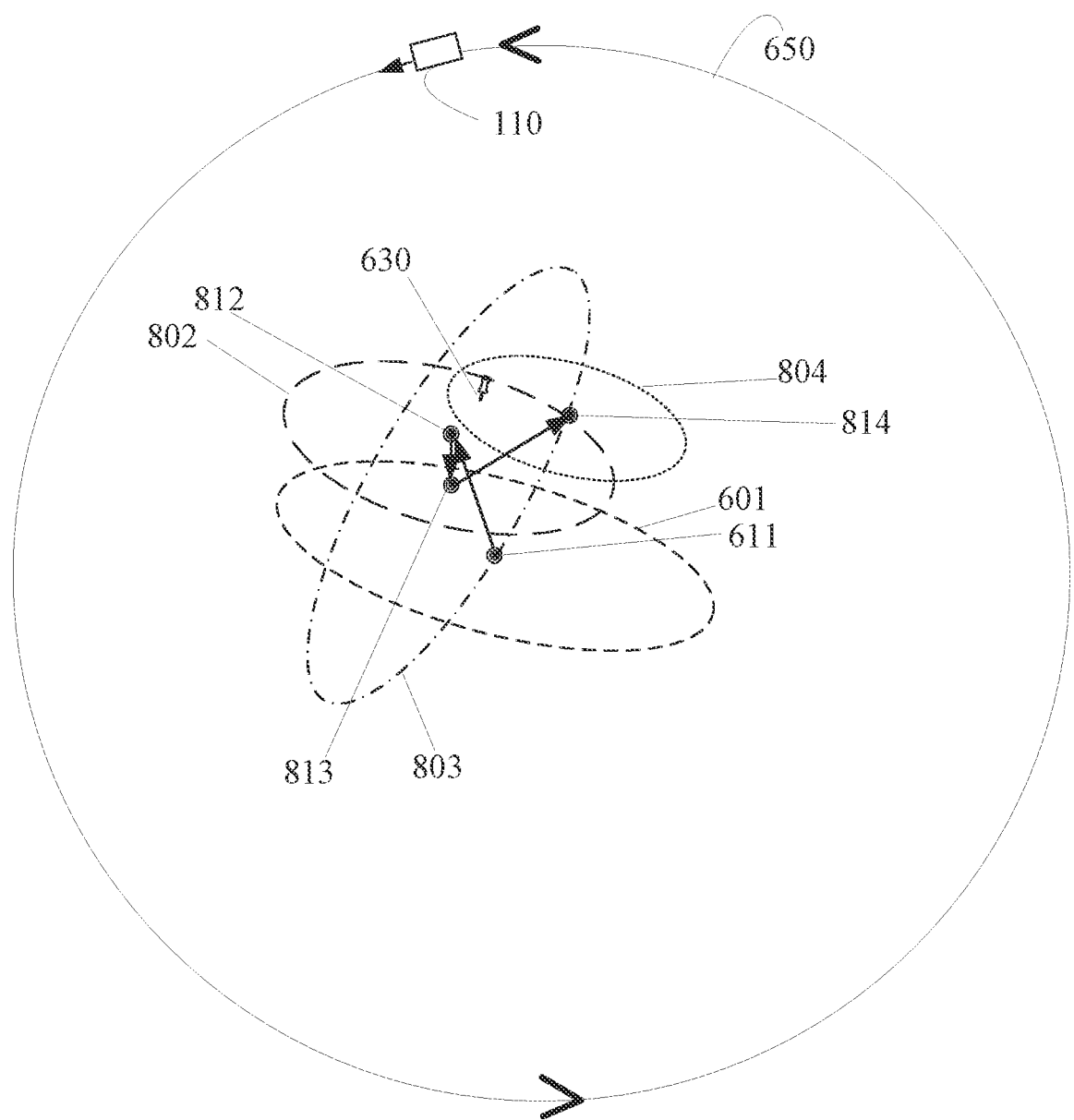
FIG. 8 is a diagram of the results of the same passive location measurements as per FIG. 6 but in this case, the individual results for each orbit of results are shown.

FIG. 8 is a diagram of the results of the same example passive location measurements as those used in FIG. 6, but in this case, the individual results for each orbit are shown. After the first of the four orbits, the calculated location of the target wireless device 120 was at point 611 with a circular error probability ellipse, CEP, 601. Discarding the readings from the first orbit, the second orbit's individual calculated location of the target wireless device 120 is at point 812 with a circular error probability ellipse, CEP, 802. Based upon only the readings of the third orbit, the calculated location of the target wireless device 120 is at point 813 with a circular error probability ellipse, CEP, 803, and based upon only the readings of the fourth orbit, the calculated location of the target wireless device 120 was at point 814 with a circular error probability ellipse, CEP, 804. Again, it may be observed that the location and CEP varies for each orbit rendering the decision as to the true location difficult to ascertain. For targets that do not have time linear changes in the rate ratio β, the deviation of the single orbit locations (as depicted in FIG. 8) from the true location is (e.g., in the general sense) smaller than the deviation of the multiple orbit locations (as depicted in FIG. 6). Also, the sizes of the ellipses, 802, 803 and 804, of the single orbit CEPs, as depicted in FIG. 8, are in the general sense larger than the overall CEP 604, as depicted in FIG. 6.

A method that merges probability ellipses, CEPs, is now described. The objective is to merge a number of individual CEPs into a single set that accurately represents the true value. In the example described above with reference to FIGS. 6 and 8, the method may be used to merge the four individual CEPs 601, 802, 803, and 804 into one merged CEP. The concept behind the method is that, as discussed above with reference to FIG. 7, the conversion of TOD as measured by the timer of the target wireless device 120 to the value as measured by the timer of the measuring station 110 uses 3 parameters, α, β, and γ for the single CEP. It may be expected that this may not be as accurate as a conversion that uses 8 parameters, i.e., $\alpha_i$, $\beta_i$ for i=1 to 4. Hence, it may be expected that the plots for the merged model may yield a better match between the TOE plot 705 and calculated distance plots 710 than those shown in FIG. 7.

The method defines a set of equations to be used to merge correlation matrices (ellipses) and to merge their respective centers, defined by the minimization process. For a given set of data, a location and an ellipse, that encompasses the value's location with 95% probability, may be generated by performing linear regression on the sum squared residuals to get the best fit. For a two dimensional data set, this generates a surface that gives an approximation of the data, and the center of the ellipse may be defined to be the point that minimizes this value.

To determine the size and orientation of the ellipse, the output of the linear regression may be used. The Jacobian comes as a result of taking the gradient of the sum squared residuals. A Gauss Newton optimization method yields the term $J^TJ$ which can be approximated as the Hessian, $$H = J^T J \quad (1)$$

It may be noted that $J^TJ$ involves the sum over all the data points since the J matrix has a size i×k where k is the number of variables and i is the data point index. Each data point gives an approximation as to where the true value lies, so in general the values may be expected to be normally distributed about this location. Hence, the position may be approximated using Gaussian random variables. When the variables are Gaussian, the covariance matrix E may be defined as:

$$\sum = \begin{bmatrix} \sigma(x, x) & \sigma(x, y) \\ \sigma(y, x) & \sigma(y, y) \end{bmatrix} \quad (2)$$

where diagonal terms are the standard deviation squared and the off-diagonal terms are the correlation terms.

The correlation matrix (2) can be shown to be the inverse of the Hessian in (1):

$$\Sigma = H^{-1} \quad (3)$$

The covariance matrix is always positive semi-definite and can therefore be factored into the Eigen decomposition:

$$\Sigma = Q \Lambda Q^T \quad (4)$$

where Q is the matrix of eigenvectors and $\Lambda$ is a diagonal matrix of eigenvalues. Then the probability ellipse has axis lengths L:

$$L_k = 2\sqrt{\chi^2 \lambda_k} \quad (5)$$

Where $\chi^2$ is a factor defined for a given confidence (5.991 for 95% at 2 degrees of freedom) and $\lambda_k$ is the kth eigenvalue. The angle of orientation of the ellipse is determined from the eigenvectors, where the principle axes point along the direction of their corresponding eigenvector. Note that only one vector is needed since the eigenvectors of a symmetric matrix are always orthogonal to each other. The method as described above is known.

The objective of the method herein described is to take two sets of data that both measure the same value and resolve them into a single approximation to obtain a more accurate estimate than either of the sets taken individually.

Each Hessian is directly derived from the data it represents. Therefore, they may be combined in a linear manner. This is similar to combining the data since a linear combination of the Jacobians is effectively being created, as shown below. Two Hessians that represent different data sets measuring the same value are:

$$H_1 = J_1^T J_1 \text{ and } H_2 = J_2^T J_2 \quad (6)$$

each of which come from the Gauss Newton method. The combined data is, $$H = J^T J \Rightarrow (J_1 + J_2)^T \cdot (J_1 + J_2) \quad (7)$$

Expanding the dot product, we have, $$H = J_1^T J_1 + J_1^T J_2 + J_2^T J_1 + J_2^T J_2 \quad (8)$$

Note that the cross terms represent different data sets and hence are zero, and therefore, the Hessian of the whole data set is the sum of the parts, $$H = H_1 + H_2 \quad (9)$$

Given the relationships (9) and (3), the covariance matrix resulting from combining data is the inverse of the sum of the Hessians:

$$\Sigma = (H_1 + H_2)^{-1} \quad (10)$$

It may be noted that the complex relationship between an ellipse (correlation matrix) of the total data and the ellipses (correlation matrices) from partial data is greatly simplified by using the relationship to the Hessians. A combined probability ellipse may be created from the two individual ellipses by simple appeal to the corresponding Hessians. In the general case the combined ellipse from the partial data sets is more accurate than the individual partial data set ellipses.

In contrast to the combining of ellipses, the relationship between the respective centers is more complex. Since the minimum in the regression is used to determine the center of the ellipses, an average of the two centers does not necessarily give the optimal result. A point may have a heavy weight where there is a small amount of variance, i.e., the center is accurate in that direction, and less weight where the variance is larger. Since, the Hessian is the inverse of the covariance matrix, a weighted average of the Hessians may be applied to prioritize the points according to their variance. Let the center of merged ellipse be $\xi$:

$$\xi = \begin{bmatrix} x \\ y \end{bmatrix} \quad (11)$$

If $\xi_1$ and $\xi_2$ are the centers of each of the partial ellipses, then the merged center $\xi$ is given by:

$$\xi = (H_1 + H_2)^{-1} H_1 \xi^1 + (H_1 + H_2)^{-1} H_2 \xi^2 \quad (12)$$

which may be expressed in a general form as:

$$\xi = \left( \sum_{i=1}^{N} H_i \right)^{-1} \left( \sum_{i=1}^{N} H_i \xi_i \right) \quad (13)$$

where N is the number of ellipses to be merged and all quantities are matrices. Basically, the centers are combined using the weighted average of the Hessians. While formally (13) is quite compact, the expression, when expanded, yields the terms as shown below. The first element of $\xi$, from (12), in the expanded form is:

$$x = \Sigma_{0,0} (\mathcal{H}_{0,0}{}^1 \xi_0{}^1 + \mathcal{H}_{0,1}{}^1 \xi_1{}^1 + \mathcal{H}_{0,0}{}^2 \xi_0{}^2 + \mathcal{H}_{0,1}{}^2 \xi_1{}^2) + \Sigma_{0,1} (\mathcal{H}_{0,1}{}^1 \xi_0{}^1 + \mathcal{H}_{1,1}{}^1 \xi_1{}^1 + \mathcal{H}_{0,1}{}^2 \xi_0{}^2 + \mathcal{H}_{1,1}{}^2 \xi_1{}^2)$$

And the second element is:

$$y = \Sigma_{0,1}(\mathcal{H}_{0,0}{}^1\xi_0{}^1 + \mathcal{H}_{0,1}{}^1\xi_1{}^1 + \mathcal{H}_{0,0}{}^2\xi_0{}^2 + \mathcal{H}_{0,1}{}^2\xi_1{}^2) + \Sigma_{1,1}(\mathcal{H}_{0,1}{}^1\xi_0{}^1 + \mathcal{H}_{1,1}{}^1\xi_1{}^1 + \mathcal{H}_{0,1}{}^2\xi_0{}^2 + \mathcal{H}_{1,1}{}^2\xi_1{}^2)$$

where the subscripts represent the element, and the superscripts are used to represent the data set to avoid confusion. Relationship (3), $\Sigma = H^{-1}$, has been used above.

Other methods of combining probability ellipses are known, but these use recursive measures in the form of the correlation matrix rather than the Hessian. Using equation (13) is more symmetric and intuitive and, when merging more than two ellipses, this may be performed in a single step rather than as an update step with multiple iterations as is required by other known methods. A major difference between this disclosed method and other known methods is that it is written in a form that is directly related to the output of the linear regression and it is written in a general form for an arbitrary number of ellipses, rather than a recursive update step. The use of the Hessian is a key component which allows an easy transition from the data to the combined probability ellipse without an excessive number of calculations.

Figure 9:
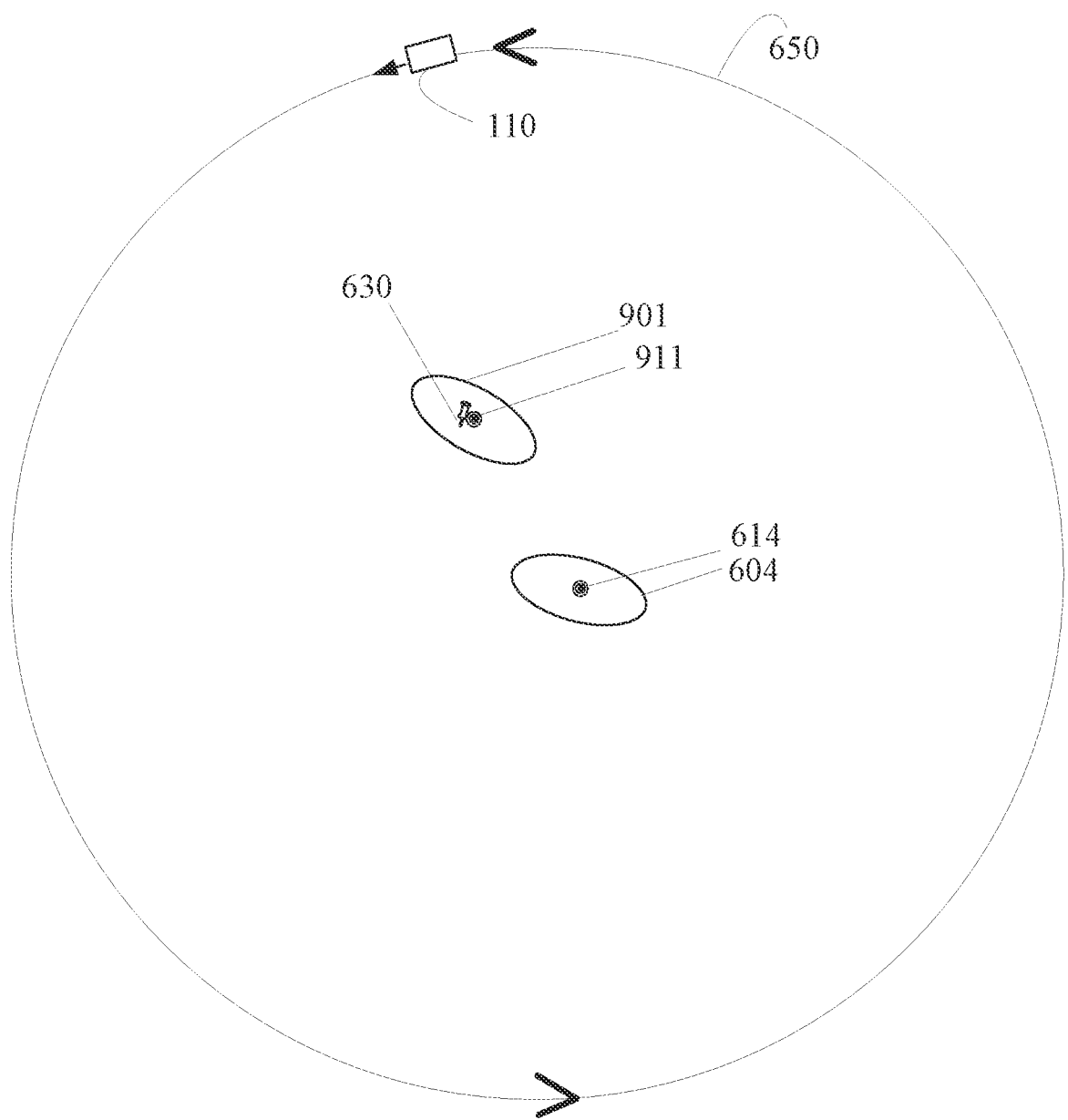
FIG. 9 is a diagram of the results of the same passive location of a wireless device, as per FIGS. 6 and 8.

FIG. 9 is a diagram of the results of the same example passive location data of the wireless device 120 that is located at true location position 630, e.g., as described above with reference to FIGS. 6 and 8. The measuring station 110 was moving in a circular orbit 650 of about 2 nm and completed four orbits. After the fourth orbit, the calculated location of the target wireless device 120 was at location point 614 with a circular error probability ellipse, CEP, 604; a position well removed from the true location 630. The calculated CEP 901 and location 911 is the result of merging the four CEPs 601, 802, 803 and 804 that correspond to each of the four orbits, as discussed above with reference to FIG. 8. It may be observed that the CEP 901 and location 911, calculated by merging the four CEPs 601, 802, 803 and 804, is close to the true location position 630.

Figure 10:
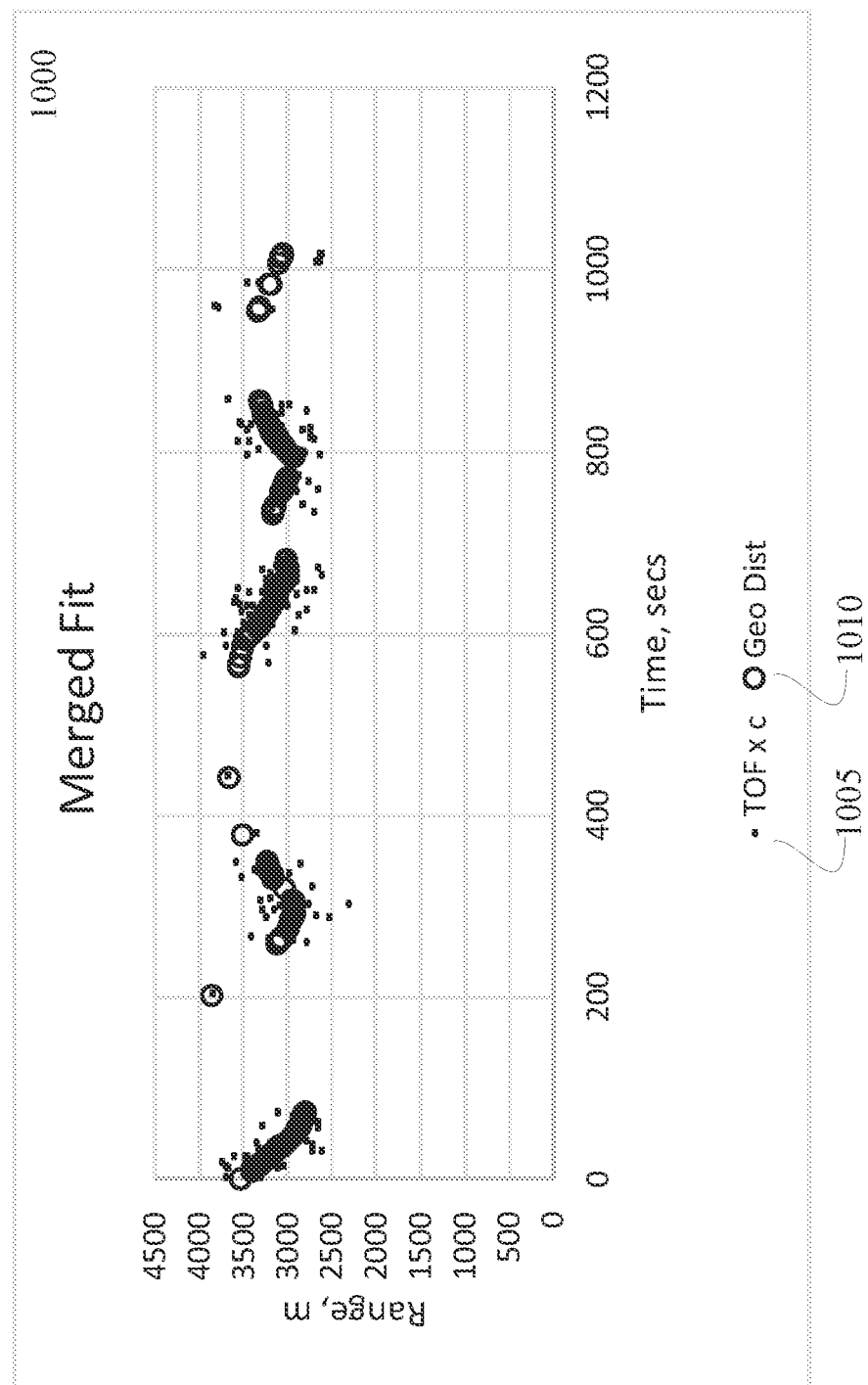
FIG. 10 is a graph of the measured ranges, and the calculated distances to the target wireless device, that correspond to the passive location measurements depicted in FIG. 9 where the location is based upon the merged CEP fit.

FIG. 10 is a graph 1000, of the measured ranges, TOF 1005, and the calculated distances 1010 to the target wireless device 120 that correspond to the passive location measurements depicted in FIG. 9 (where the location is based upon the merged CEP fit). It should be noted that the TOF plot 1005 is a good fit to the calculated geo distance plot 1010, contrast to the plots 705 and 710 in FIG. 7. Comparing FIG. 7, the single CEP fit, with FIG. 9, the merged. CEP fit, two differences may be noted in the TOF plots, 705 and 1005 respectively. First, there are differences in the vertical displacement of the single CEP fit compared of the groups of data for the first, second, third, and fourth orbit data subsets, which are used for the merged fit. Second, there are differences in the slopes. The differences in the vertical displacements; the single CEP, plot 705 varies from 7000 m to 1000 m whereas for the merged. CEP, plot 905 is typically around 3000 m. These differences are due to different values of the parameters $\alpha$, and $\beta$ and $\gamma$ in the single fit compared to the 4 values of $\alpha$ and $\beta$, one for each orbit, for the merged CEP fit. The TODs of the single CEP fit are converted by a single value for a, by the effect of a single value for $\beta$ multiplied by the time evolved and a single value for $\gamma$ multiplied by time squared. For the merged CEP fit there are 4 different values for a controlling the vertical displacements and 4 different values of $\beta$ controlling the overall slope trends.

The sum square residuals for the combined model are much better than the sum square residuals for the overall ellipse, e.g., because vertical displacements and the slope trends for the partial data sets can be better matched to the measurement by using 4 values of $\alpha$ and $\beta$ instead of single values of $\alpha$ and $\beta$.

Each case of replacing the overall CEP with a combined CEP can be validated by checking for consistency of the partial CEPs in terms of centers being contained in the other ellipses and by validating the additional parameter count using an F Test. In some embodiments, the F Test may refer to a statistical test usable to determine whether an improvement of a sum of least square residuals is a result of larger number of parameters for a merged model compared to an original model or is statistically significant.

Figure 11:
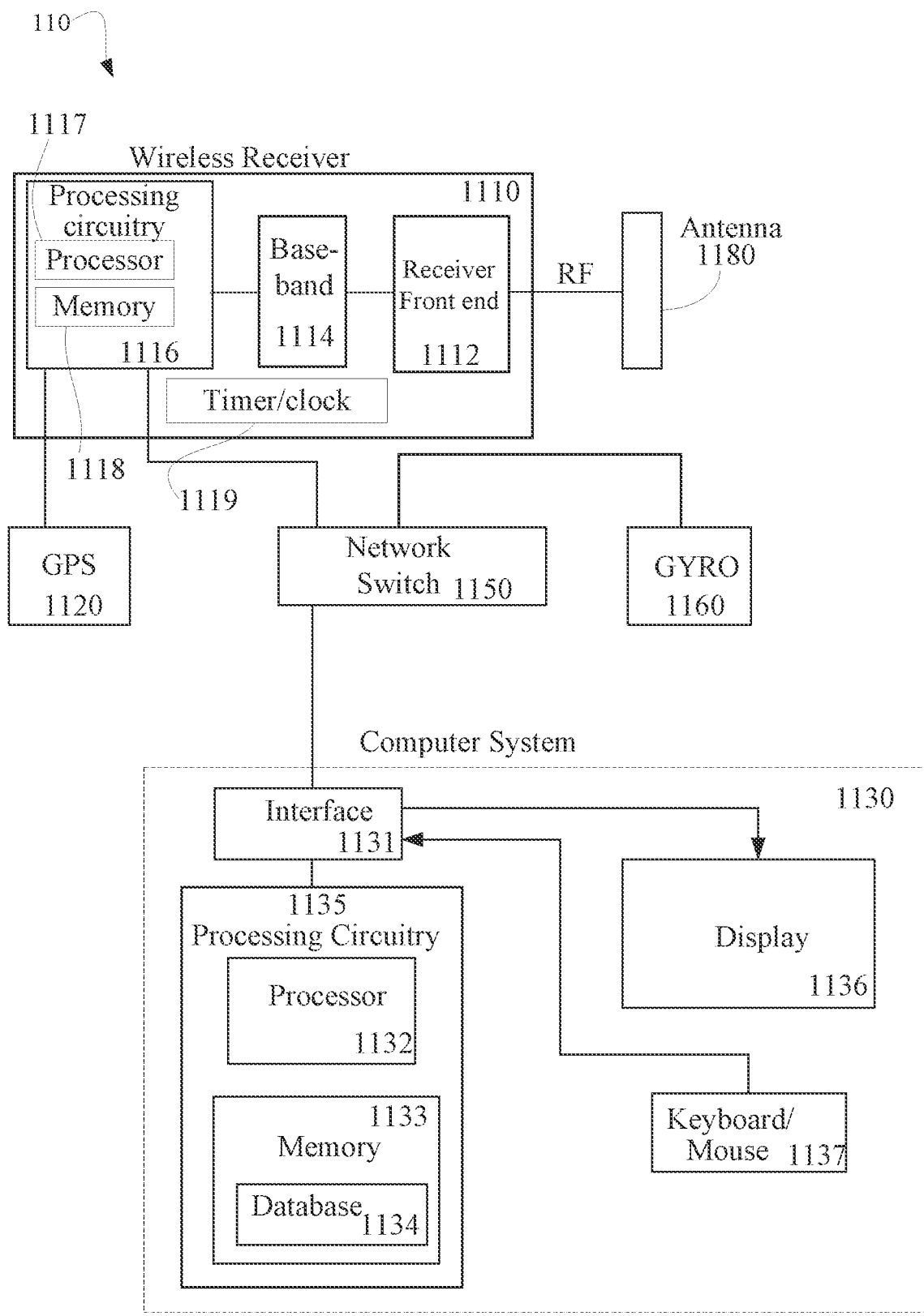
FIG. 11 illustrates an example wireless communication device, such as measuring station, according to embodiments of the present disclosure.

FIG. 11 illustrates an exemplary measuring station 110, according to embodiments of the present disclosure. Measuring station 110 may be any device capable of wirelessly receiving signals and can execute any of the methods illustrated in the present disclosure. It may be a station, an access point, or the like. It may be a wireless device that is based upon the IEEE 802.11 specification. In one embodiment, measuring station 110 may include an antenna 1180, a wireless receiver 1110, a computer system 1130, a global positioning system (GPS) 1120, a gyro 1160 and a network switch 1150 such as an Ethernet switch.

The wireless receiver 1110 may receive radio frequency (RF) signals from the antenna 1180. The GPS 1120 output may be connected to the wireless receiver 1110. The GPS 1120 may provide the latitude, longitude, and altitude of the measuring station 110. The wireless receiver 1110 may append GPS information to any RF reception. The network switch 1150 may be connected to the wireless receiver 1110, the gyro 1160, and the computer system 1130. The wireless receiver 1110 includes a receiver front end 1112, a baseband 1114 and processing circuitry 1116. The receiver front end 1112 may perform the usual functions of an RF receiver front end such as low noise amplification, filtering, and frequency down conversion so as to condition the received signal suitable for inputting to the baseband 1114. Baseband 1114 may perform the usual functions of a baseband such as demodulation, descrambling, and error correction of received packets as described in the Standard. The processing circuitry 1116 may include a processor 1117 and a memory 1118. In addition to a traditional processor and memory, processing circuitry 1116 may comprise integrated circuitry for processing and/or control, e.g., one or more processors and/or processor cores and/or FPGAs (Field Programmable Gate Array) and/or ASICs (Application Specific Integrated Circuitry). Processor 1117 may be configured to access (e.g., write to and/or reading from) memory 1118, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1118 may be configured to store code executable by processor 1117 and/or other data, e.g., data pertaining to communication, e.g., configuration and/or address data of nodes, etc.

Processing circuitry 1116 may be configured to control any of the methods and/or processes described herein and/or to cause such methods and/or processes to be performed, e.g., by measuring station 110. Corresponding instructions may be stored in the memory 1118, which may be readable and/or readably connected to processor 1117. In other words, processing circuitry 1116 may comprise a microprocessor and/or microcontroller and/or FPGA (Field-Programmable Gate Array) device and/or ASIC (Application Specific Integrated Circuit) device. The GPS information may be provided to the processing circuitry 1116 by the GPS 1120. RF receptions, e.g., beacons, may have the GPS information added such that the position of the measuring station 110 is known for each received signal. The GPS information, together with information related to the received signals, may be sent to the network switch 1150 and therefore made available to the computer system 1130. In some embodiments, the network switch 1150 is an Ethernet switch.

The computer system 1130 may include an interface 1131. Interface 1131 may contain an Ethernet connection to the network switch 1150, the connection to a display 1136, a connection to a keyboard and mouse 1137 as well as interfacing to the processing circuitry 1135. In some embodiments the processing circuitry 1135 may include a processor 1132, a memory 1133 and a database 1134. The database 1134 may contain the ground mapping information of the area of interest and the processor 1132 and memory 1133 may be used to carry out all or part of the exemplar processes as described above with reference to FIGS. 6, 7, 8, 9, and 10 and as further described in equations (1) to (13). The processor 1132 and memory 1133 may be used to carry out processes for the geo-location of the target wireless device 120, using the TOD and TOA times as reported by processing circuitry 1116 in the wireless receiver 1110, information on the position of the measuring station 110 derived from the GPS 1120 and the gyro 1160, plus information on the target station 120 which may be inputted using the keyboard and mouse 1137 The display 1136 may be used to show the ground map together with the estimated location of the target station 120 in the form of a CEP with a center.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 1135 may include the memory 1133 and a processor 1132, the memory 1133 containing instructions which, when executed by the processor 1132, configure the processor 1132 to perform the one or more functions described herein. In addition to a traditional processor and memory, the processing circuitry 1135 may comprise integrated circuitry for processing and/or control, e.g., one or more processors and/or processor cores and/or FPGAs (Field Programmable Gate Array) and/or ASICs (Application Specific Integrated Circuitry).

The processing circuitry 1135 may include and/or be connected to and/or be configured for accessing (e.g., writing to and/or reading from) the memory 1133, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1133 may be configured to store code executable by control circuitry and/or other data, e.g., data pertaining to communication, configuration and/or address data of nodes, etc. The processing circuitry 1135 may be configured to control any of the methods described herein and/or to cause such methods to be performed, e.g., by the processor 1132. Corresponding instructions may be stored in the memory 1133, which may be readable and/or readably connected to the processing circuitry 1135. In other words, the processing circuitry 1135 may include a controller, which may comprise a microprocessor and/or microcontroller and/or FPGA (Field-Programmable Gate Array) device and/or ASIC (Application Specific Integrated Circuit) device. It may be considered that the processing circuitry 1135 includes or may be connected or connectable to memory, which may be configured to be accessible for reading and/or writing by the controller and/or processing circuitry 1135.

According to an embodiment of the disclosure, wireless receiver 1110 is arranged to receive transmissions of another wireless device 120. Processing circuitry 1116 is arranged to monitor an attribute of the beacon transmissions of wireless device 120 and determine the value of the TSF field in the beacons of wireless device 120. In addition, according to an embodiment of the disclosure, wireless receiver 1110 is arranged to measure the time of arrival of the received beacon transmissions of wireless device 120. This may be accomplished by outputting the value of the TSF timer, or another internal timer/clock 1119, of the measuring station 110 that corresponds to a precise point in time when the beacon was received. In one embodiment, this point in time may correspond to the time when the frame check is completed. In other embodiments, the point in time may be taken at various other points in the received beacon, for example the time when the clear channel assessment (CCA) of measurement station 110 was exerted by the beacon reception, or the point where the header of the beacon is verified. This timing may also be accomplished by outputting a trigger that is timed to coincide with the reception of the beacon from wireless device 120. This trigger may correspond to any known point within the reception of the beacon. This trigger may then be used to read the time from an internal timer/clock 1119. Timer/clock 1119 may have a precision that is higher than the internal TSF timer that is part of the measuring station 110.

According to an embodiment of the disclosure, computer system 1130 may be connected to wireless receiver 1110. Computer system 1130 may be a computer system with an associated display module such as a laptop or tablet computer or may be a computer system with a separate display monitor. Computer system 1130 may be used as an operator interface for measuring station 110 and to display the location of wireless devices 120 on a digital grid or map. The calculations described in this disclosure may be performed using software in the processing circuitry 1135, the timing information (e.g., required timing information) being provided by an interconnection link with wireless receiver 1110.

In some embodiments, a measuring station 110 for determining a location of a wireless device 120, e.g., wireless access point, is provided. The measuring station 110 is configured to receive a plurality of beacons from the wireless device 120. Processing circuitry 1116 includes a memory 1118 and a processor 1117, where the memory 1118 may be in communication with the processor 1117. The memory 1118 may have instructions that, when executed by the processor 1117, configure the processor 1117 to perform a variety of tasks. In one embodiment, these tasks include identifying a plurality of TODs of a corresponding plurality of beacons received at measuring station 110. Each of the plurality of TODs may indicate when the wireless device 120 transmitted a beacon to the measuring station 110 according to a timer associated with the wireless device 120. The task may also include identifying a plurality of TOAs corresponding to the plurality of beacons at the measuring station 110 according to a timer/clock 1119 associated with the measuring station 110; and synchronizing the timer associated with the wireless device 120 with the timer/clock 1119 associated with the measuring station 110. The synchronizing of the timers may include applying a factor α for correcting the timer associated with the measuring station 110 when the measuring station 110 receives the plurality of beacons and/or applying a factor β for correcting a ratio of timer rates between the timer associated with the wireless device 120 and the time/clock 1119 associated with the measuring station 110. The synchronization may further include applying a factor γ for correcting the changes in the ratio of frequency drifts in the timer associated with the wireless device 120. The processor 1117 is further configured to determine a plurality of TOFs corresponding to the plurality of beacons, where the plurality of TOFs may be based at least in part upon the plurality of TODs, the plurality of TOAs, and the synchronization of the timer associated with the wireless device 120 and the timer/clock 1119 associated with the measuring station 110. Processor 1117 may further be configured to determine a location of the wireless device 120 based at least in part on the determined plurality of TOFs, and the synchronization of the timer associated with the wireless device 120 and the timer/clock 1119 associated with the measuring station 110. In some embodiments, the processing circuitry 1135 may be used either in place of or together with the processing circuitry 1116 for the synchronization of the timers and calculations of the TOFs. The plurality of TOFs, together with the location information of the measuring station 110 for each TOF, may then be used to calculate a location for the wireless device 120. The location may comprise a CEP ellipse with a center as discussed above with reference to FIGS. 6, 8, and 9. As discussed above with reference to FIG. 8, a new CEP ellipse may be calculated for every orbit of the measuring station 110. Such calculations may take place in the processing circuitry 1116 in the wireless receiver 1110 and/or the processing circuitry 1135 in the computer system 1130. Furthermore, as discussed above with reference to FIG. 9, the CEPs calculated for each orbit may then be merged to produce a single CEP ellipse.

In the example above a new CEP ellipse may be calculated for every orbit of the measuring station 110. Any period of time may be used, and the periods do not need to be equal. The longer the period used, the more possibility that the relative timer drift β becomes non-linear and as such very long time periods are not recommended. However, the shorter the period, the fewer TOFs that may be gathered. Hence, the CEP accuracy may be low, leading to large CEP ellipses. In the known passive geo-location schemes, the accuracy is improved and synchronization calculations are more accurate at the point that the measuring station 110 returns or is near to a position that it has occupied earlier. Hence, the choice to use an orbit is reasonable as long as the orbit duration is not too long. If the measuring station 110 is at same point at two different times, the TOFs measured at this point may be the same. It is also possible to use an orbit, or a maximum time, whichever comes first. As all the TOF data may be stored for an entire mission, it is also possible to calculate the CEPs and the merged CEP for various time durations and then determine the best fit(s) by looking at the β variations across the individual CEPs.

It may be noted that the second order term γ is not always used when CEP merging takes place. As merging CEPs has the objective of overcoming non-linear changes in β which cannot be corrected by the second order term γ, calculating a value for γ may be moot. The decision to use the merging CEP method in place of a single set α, β, γ fit may be determined by using an F Test between the single CEP fit and the merged CEP set. In the general sense only α and β terms are used when the option of merging the CEPs is used. In principle, the γ term can be included, but experience with the F Test has demonstrated that including the γ term does not improve the calculations after more than 1 orbit has taken place.

Figure 12:
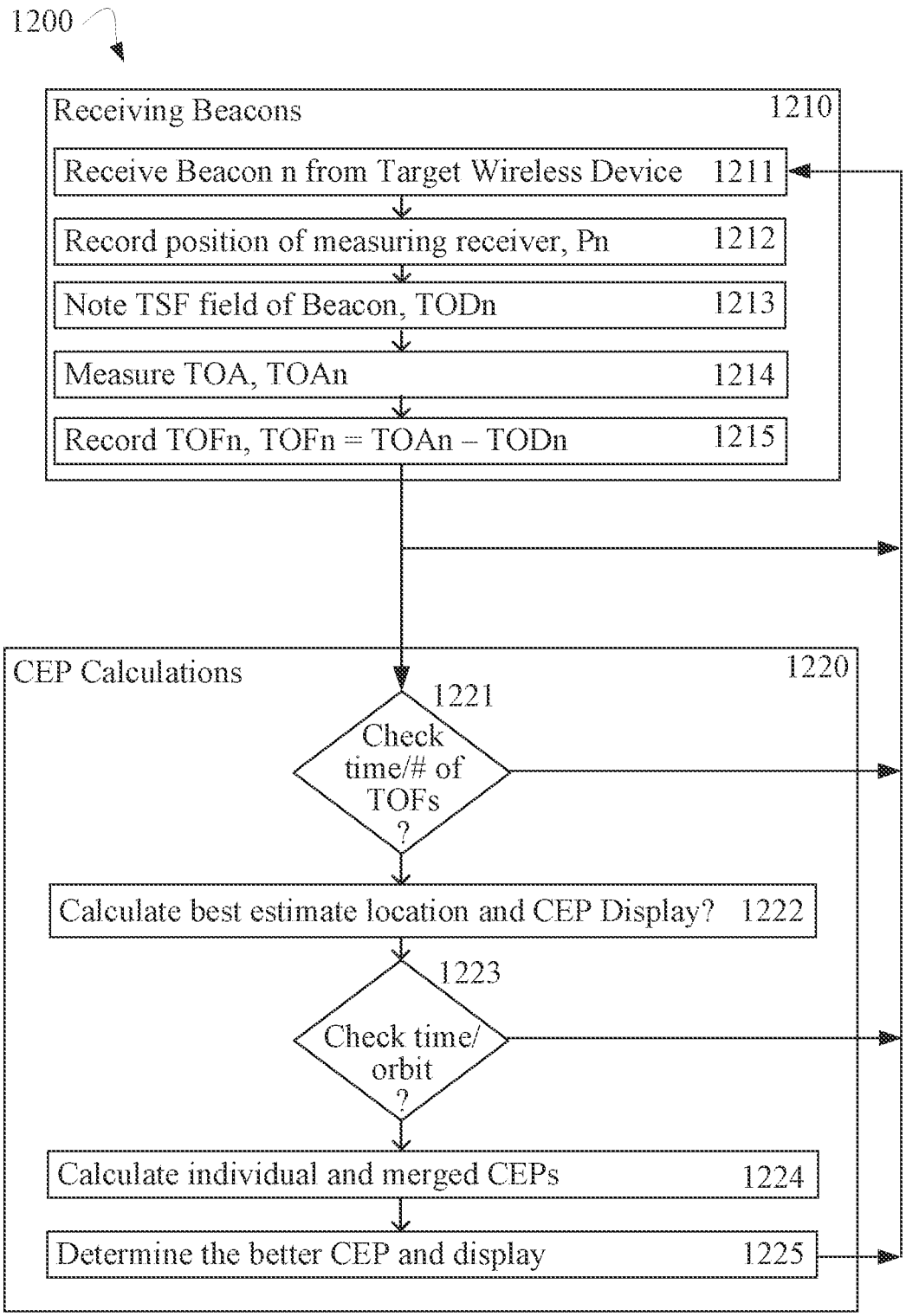
FIG. 12 is an example flow diagram illustrating an embodiment of the method of the present disclosure.

FIG. 12 is an example flow diagram 1200 illustrating an embodiment of one of the methods of the present disclosure. The method 1200 may comprise two main sections, receiving beacons 1210 and CEP calculations 1220. In the receiving beacons portion 1210, beacons from the target wireless device 120 may be received by the measuring station 110. The beacons may be received via the antenna 1180, amplified and down converted by the receiver front end 1112, demodulated by baseband 1114 and inputted to the processing circuitry 1116. At step 1211, beacon n, from the wireless device 120, is received, and at step 1212, the position Pn of the measuring station 110, is recorded. The position Pn may be recorded in the memory 1118 of the processing circuitry 1116 using the inputs of the GPS 1120 and/or the gyro 1160. At step 1213, the value of the TSF field, TODn, in beacon n is noted (e.g., determined, stored, etc.). The TSF field may be extracted from beacon n after demodulation by the baseband 1114 and processed in the processing circuitry 1116. At step 1214 the time of arrival, TOAn, of beacon n is measured. The TOA may be measured using the timer/clock 1119. At step 1215, the time of flight, TOFn, is recorded (e.g., determined, stored, etc.). TOFn is calculated as TOFn=TOAn−TODn. The calculations of the TOFs may take place in the processing circuitry 1116 and/or processing circuitry 1135. The raw data TODn, TOAn, together with TOFn and Pn may be recorded in database 1134.

CEP calculations 1220 may start with a check, at step 1221, that enough TOFs have been collected and a predetermined interval of time (e.g., sufficient time) has elapsed for a first or new calculation of the CEP to be carried out. If the check at step 1221 is positive, then at step 1222 a CEP calculation is carried out. In order to calculate a first CEP and make a decision to display it, a number of TOF readings may be used (e.g., may be required) such that a meaningful estimate for β can be made. Once the first CEP has been calculated, then updates (i.e., new CEP calculations) may take place based upon time and a minimum number of new TOFs. For example, a CEP with an ellipse radius under a certain maximum value may be used for the first CEP display, and then new CEPs may be calculated at regular intervals, e.g., if new TOFs are available. A maximum ellipse radius of, say, 50% of the orbit 650 radius, and a regular time interval of, say, 15 seconds may be used. If, at step 1221, it is determined that there are insufficient TOFs available and/or the time elapsed since that last CEP was calculated is not over a preset limit, then the method returns to step 1211. The check at step 1221, and the calculations performed at step 1222 may be performed by a processing circuitry such as the processing circuitry 1135 in the computer system 1130. If, at step 1222, a CEP is calculated that meets the criteria for display, i.e., the CEP has an ellipse diameter less than a maximum value, then at step 1222 a decision is made to display that CEP. The CEP may be displayed on display 1136 such as superimposed on a map of the area of interest (e.g., stored in database 1134 as selected by the operator using key/mouse 1137). At step 1222, an overall CEP is calculated based upon all n TOFs and Pn; if a CEP has not been previously displayed, then a decision may be made to display the new CEP. If, however, a CEP is currently being displayed, then the new overall CEP, calculated at step 1222, may be displayed in its place.

At step 1223, a check may be carried out on the time elapsed and/or the position of the measuring station 110. As discussed above with reference to FIGS. 6, 8, and 9, if the timers in the wireless device 120 and the measuring station 110 vary such that the parameter β varies in a non-predictable manner, then the calculated overall CEP may drift and become progressively inaccurate with the higher the number of orbits 650. As discussed above with reference to FIG. 9, and equations (1) to (13), separate individual CEPs (which may correspond either to increments in time, fixed or variable, or to orbits, portions or numbers of orbits) may be calculated. The individual CEPs may be merged to create a merged CEP. In step 1223 a check is made if sufficient time has elapsed and/or the measuring station 110 has completed a distance related to a number of orbits, such that individual CEPs and a merged CEP may be calculated in step 1224. For example, in step 1224, if the measuring station 110 has completed, e.g., three orbits, a decision may be made that CEPs may be calculated for each orbit, in addition to the overall CEP calculated in step 1222 that is the result of all three orbits. Furthermore, in step 1224, a merged CEP may be calculated that is the result of merging those three individual CEPs. In step 1225, the merged CEP calculated in step 1224 may be compared with the overall CEP calculated in step 1222, and a decision made as to which CEP is the better fit. As discussed above with reference to FIGS. 7 and 10, the better fit of the calculated geo distance and TOF readings can be assessed, for example by use of the F Test. Also, the two CEPs may be compared to assess which is more consistent with the individual CEPs that were calculated in step 1224. The better CEP may then be displayed, and the method returns to step 1211. The CEP calculations 1220 may be performed by a processing circuitry such as processing circuitry 1135.

It may be intuitive that the more measurements, i.e., TOFs, taken by the measuring station 110, the more accurate the result of calculations based on the TOFs to estimate the location of a target, e.g., wireless device 120. However, the longer the measurements are taken, the greater the possibility that the relative timer drift between the measuring station 110 and the wireless device 120 suffers from changes that cannot be compensated for. When this occurs, as discussed above with reference to FIG. 6, the overall CEP of the estimated location of the wireless device 120 becomes progressively more inaccurate as the modelling of the relative timer drift becomes more and more unable to fit the actual relative timer drift. The method of calculating individual CEPs and then calculating a merged CEP is used to overcome this relative timer drift change between the measuring station 110 and the wireless device 120. By calculating individual CEPs based upon shorter times than the complete elapsed time, the effect of the timer drift may be reduced within each CEP but as there are fewer measurements within each CEP, the radii of each of these CEPs may be expected to be relatively large compared to the radius of the overall CEP. The calculation of the merged CEP, as described above with reference to equations (1) to (13) is such that the merged CEP uses the complete set of measurements but may minimize the effect of non-linear changes in the second order term β of the timer drift model. If the relative timer drift between the measuring station 110 and the wireless device 120 do not exhibit non-linear changes in the second order term β, then the overall CEP may probably correctly locate the wireless device and exhibit a smaller radius than the merged CEP. In this case, the overall CEP may be displayed. Hence, as discussed above with reference to FIG. 12 step 1225, a determination is made to check if the merged CEP is a better fit than the overall CEP, or vice versa. This determination may be made by checking the consistency with the previous individual CEPs and/or by an F Test on the overall fit of the TOFs to the calculated geo distances.

FIG. 13 shows an example process 1300 (e.g., method in a measuring station 110). One or more steps of the method may be performed by measuring station 110 and/or any of its components such as wireless receiver 1110 (and/or processing circuitry 1116 and/or processor 1117 and/or memory 1118 and/or baseband 1114 and/or receiver front end 1112) and/or interface 1131 and/or processing circuitry 1135 (and/or processor 1132 and/or memory 1133) and/or display 1136, etc. The method includes, at step 1301, determining a plurality of Time of Flights (TOFs) corresponding to the plurality of beacons. The plurality of TOFs is determined based at least in part upon a plurality of Time of Departures (TODs) corresponding to the plurality of beacons and a plurality of Time of Arrivals (TOAs) corresponding to the plurality of beacons. At step 1302, an overall circular error probability ellipse (CEP) is determined based at least in part upon the plurality of TODs and a corresponding plurality of measuring station positions for each TOF. At step 1303, a merged CEP is determined, where the merged CEP includes the plurality of individual CEPs. The method further includes, at step 1304, determining the merged CEP is a better CEP if the merged CEP is more consistent with the plurality of individual CEPs than with the overall CEP. The better CEP is usable to determine the location of the wireless device 120.

Some embodiments are described herein with reference to flowchart illustrations and/or block diagrams of methods, systems and computer program products. It may be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of more than one measuring receiver, the details of the formulas used to calculate a merged CEP, the formulas that include the three timer correction terms, the details of the measuring station, the method of measuring the time of arrival, the use of the internal TSF timer and an alternative time source to increase the accuracy, the choice of time elapsed and/or orbits made before calculating individual CEPS and merged CEP, the criteria for displaying a CEP. Accordingly, the scope should be determined not by the embodiments illustrated, but by the claims and embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a measuring station configured to receive a plurality of beacons from the wireless device and determine a location of the wireless device, the method comprising:
   determining a plurality of Time of Flights, TOFs, corresponding to the plurality of beacons, the plurality of TOFs being determined based at least in part upon a plurality of Time of Departures, TODs, corresponding to the plurality of beacons and a plurality of Time of Arrivals, TOAs, corresponding to the plurality of beacons;
   determining an overall circular error probability ellipse, CEP, based at least in part upon the plurality of TODs and a corresponding plurality of measuring station positions for each TOF;
   determining at least one individual CEP of a plurality of individual CEPs if at least one of a predetermined time has elapsed and the measuring station has travelled a predetermined distance, each individual CEP of the plurality of individual CEPs corresponding to at least one of the predetermined time and the predetermined distance;
   determining a merged CEP, the merged CEP including the plurality of individual CEPs; and
   determining the merged CEP is a better CEP if the merged CEP is more consistent with the plurality of individual CEPs than with the overall CEP, the better CEP being usable to determine the location of the wireless device.

2. The method of claim 1, wherein the method further includes:
   determining a merged center, $\xi$, of the merged CEP, the merged center, $\xi$, being:

$$\xi = \left(\sum_{i=1}^{N} H_i\right)^{-1} \left(\sum_{i=1}^{N} H_i \xi_i\right)$$

where N is a number of CEPs to be merged, and H is a Hessian expressed as:

$$H \approx J^T J$$

where the Jacobian J is a result of taking a gradient of sum squared residuals.

3. The method of claim 1, wherein the determining the overall CEP is performed if a predetermined quantity of TOFs have been determined and another predetermined time has elapsed.

4. The method of claim 1, wherein the determining the merged CEP is the better CEP is based on an F Test on an overall fit of the TOFs to geo distances, the F Test being a statistical test to determine if an improvement of summed least square residuals is one of:
   a result of larger number of parameters for a merged model compared to an original model; and
   statistically significant.

5. The method of claim 1, wherein the method further includes:
   displaying at least one of the overall CEP, at least one individual CEP of the plurality of individual CEPs, the merged CEP, the better CEP, and the location of the wireless device.

6. The method of claim 1, wherein the synchronizing of the first timer with the second timer includes:
   applying a first factor for correcting the second timer associated with the measuring station when the measuring station receives the plurality of beacons.

7. The method of claim 1, wherein the synchronizing of the first timer with the second timer includes:
   applying a second factor for correcting a ratio of timer rates between the first timer a measuring station clock.

8. The method of claim 1, wherein the synchronizing of the first timer with the second timer includes:
   applying a third factor for correcting changes in a ratio of frequency drifts in the first timer associated with the wireless device.

9. The method of claim 1, wherein at least one TOD is determined based on a value of a timer synchronization function, TSF, field, in a corresponding beacon.

10. A measuring station configured to receive a plurality of beacons from a wireless device and determine a location of the wireless device, the measuring station comprising processing circuitry configured to:
   determine a plurality of Time of Flights, TOFs, corresponding to the plurality of beacons, the plurality of TOFs being determined based at least in part upon a plurality of Time of Departures, TODs, corresponding to the plurality of beacons and a plurality of Time of Arrivals, TOAs, corresponding the plurality of beacons;

determine an overall circular error probability ellipse, CEP, based at least in part upon the plurality of TODs and a corresponding plurality of measuring station positions for each TOF;

determine at least one individual CEP of a plurality of individual CEPs if at least one of a predetermined time has elapsed and the measuring station has travelled a predetermined distance, each individual CEP of the plurality of individual CEPs corresponding to at least one of the predetermined time and the predetermined distance;

determine a merged CEP, the merged CEP including the plurality of individual CEPs; and determine the merged CEP is a better CEP if the merged CEP is more consistent with the plurality of individual CEPs than with the overall CEP, the better CEP being usable to determine the location of the wireless device.

11. The measuring station of claim 10, wherein the processing circuitry is further configured to:

determine a merged center, $\xi$, of the merged CEP, the merged center, $\xi$, being:

$$\xi = \left(\sum_{i=1}^{N} H_i\right)^{-1} \left(\sum_{i=1}^{N} H_i \xi_i\right)$$

where N is a number of CEPs to be merged, and H is a Hessian expressed as:

$H \approx J^T J$ where the Jacobian J is a result of taking a gradient of sum squared residuals.

12. The measuring station of claim 10, wherein the determining the overall CEP is performed if a predetermined quantity of TOFs have been determined and another predetermined time has elapsed.

13. The measuring station of claim 10, wherein the determining the merged CEP is the better CEP is based on an F Test on an overall fit of the TOFs to geo distances, the F Test being a statistical test to determine if an improvement of summed least square residuals is one of:

a result of larger number of parameters for a merged model compared to an original model; and statistically significant.

14. The measuring station of claim 10, wherein the processing circuitry is further configured to cause:

a display of at least one of the overall CEP, at least one individual CEP of the plurality of individual CEPs, the merged CEP, the better CEP, and the location of the wireless device.

15. The measuring station of claim 10, wherein the synchronizing of the first timer with the second timer includes:

applying a first factor for correcting the second timer associated with the measuring station when the measuring station receives the plurality of beacons.

16. The measuring station of claim 10, wherein the synchronizing of the first timer with the second timer includes:

applying a second factor for correcting a ratio of timer rates between the first timer a measuring station clock.

17. The measuring station of claim 10, wherein the synchronizing of the first timer with the second timer includes:

applying a third factor for correcting changes in a ratio of frequency drifts in the first timer associated with the wireless device.

18. The measuring station of claim 10, wherein at least one TOD is determined based on a value of a timer synchronization function, TSF, field, in a corresponding beacon.

19. The measuring station of claim 10, wherein the measuring station is configurable to complete at least one orbit relative to the wireless device, and the merged CEP is determined when a predetermined quantity of completed orbits is met.

* * * * *